United States Patent
Barnes et al.

(10) Patent No.: US 6,223,200 B1
(45) Date of Patent: Apr. 24, 2001

(54) SYSTEM AND METHOD FOR REDUCING RESEARCH TIME THROUGH A LOCK WAIT MATRIX

(75) Inventors: Cherie Carlyle Barnes, Barton; David John Wierbowski, Owego, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/226,224

(22) Filed: Apr. 11, 1994

Related U.S. Application Data (63) Continuation of application No. 07/924,575, filed on Aug. 5, 1992, which is a continuation of application No. 07/455,645, filed on Dec. 22, 1989, now abandoned.

(51) Int. Cl.[7] .................................................. G06F 9/00

(52) U.S. Cl. ............................................................. 709/100

(58) Field of Search ........................ 364/DIG. 1, DIG. 2; 395/650; 709/100, 101, 102, 103, 104, 105, 106, 107, 108; 714/25

(56) References Cited

U.S. PATENT DOCUMENTS

| | | | |
|---|---|---|---|
| 3,579,194 | * 5/1971 | Weinblatt | 364/200 |
| 4,189,771 | * 2/1980 | Roever | 364/300 |
| 4,224,664 | * 9/1980 | Trinchieri | 364/200 |
| 4,318,182 | * 3/1982 | Bachman et al. | 364/200 |
| 4,403,285 | * 9/1983 | Kikuchi | 364/200 |
| 4,435,766 | * 3/1984 | Haber et al. | 364/300 |
| 4,791,554 | * 12/1988 | Hirota et al. | 364/200 |
| 4,914,569 | * 4/1990 | Levine et al. | 395/500 |
| 5,008,882 | * 4/1991 | Peterson et al. | 370/94.3 |
| 5,123,104 | * 6/1992 | Levine et al. | 395/600 |

OTHER PUBLICATIONS

Roesler et al, Efficient Deadlock Resolution For Lock–Based Concurrency Control Schemes, Conference Paper, Jun. 13–17, 1988, Publisher IEEE Computer Society Press, Washington DC.*

Elmagarmid et al, Two–Phase Deadlock Detection Algorithm, IEEE Transactions on Computers, vol. 37, No. 11, Nov. 1988.*

Information Processing Letters, vol. 17, No. 4, Nov. 1983, pp. 185–188; Shmueli: 'Dynamic Cycle Detection'.

Distributed Algorithms, 3rd Int'l Workshop; Sep. 1989, Nice, France, pp 195–206; RUKPZ: 'A Distributed Solution for Detecting Deadlock in Distributed Nested Transaction Systems'.

(List continued on next page.)

Primary Examiner—Majid Banankhah
(74) Attorney, Agent, or Firm—Arthur J. Samodovitz (57) ABSTRACT

A shared file computer system has multiple users, and two or more transactions established by the users may contend for the same resource. Such contention may result in a deadlock condition. To search for such deadlocks, the system maintains a lock wait matrix which lists which transactions are waiting on which other transactions. The matrix represents a hierarchical wait tree. A deadlock is present when the top node transaction in the tree also occurs lower in the tree. In such a case, either the top node transaction or any other transaction in the path or branch between the two occurrences of the top node transaction is cancelled to resolve the deadlock represented by this path. However if the intermediary node is cancelled to resolve this deadlock, a similar deadlock can occur in another path and must be resolved also. There can be thousands of paths in the tree to be searched for such a deadlock condition, and to optimize the deadlock search after the intermediary node is cancelled, transactions leading from this intermediary node are not examined. Nevertheless, all deadlock conditions are detected.

26 Claims, 11 Drawing Sheets

OTHER PUBLICATIONS

J. Eliot B. Moss, Nested Transactions, An Approach To Reliable Distributed Computing, 1985, pp. 94–114.*

Eigh, M. H. Graph Directed Locking, IEEE Transactions on Software Engineering, vol. 14, No. 2 Feb. 1988.*

Agrawal et al, The Performance of Alternative Strategies for Dealing With Deadlocks In Database Management Systems, IEEE Trans, on Soft. Eng. vol. SE–13, No. 12 Dec. 1987 pp. 1349–1361.*

Wuu et al, False Deadlock Detection in Distributed Systems, IEEE Trans, On Soft. Engr. vol. SE–11 No. 8 Aug. 1985, pp 820–821.*

* cited by examiner

SYSTEM AND METHOD FOR REDUCING RESEARCH TIME THROUGH A LOCK WAIT MATRIX

This application is a continuation, of application Ser. No. 07/455,645, filed Dec. 22, 1989 now abandoned.

The application is a continuation, of application Ser. No. 07/924,575, filed Aug. 5, 1992.

This invention relates generally to computer systems which provide multiple users with access to the same logical resource, and more particularly to methods and techniques for detecting deadlocks involving a transaction which has locked one required resource while being locked out of another required resource.

BACKGROUND OF THE INVENTION

Generally speaking, a deadlock arises in a computer system whenever transactions require the use of more than one resource in order for the transaction to be completed. In other words, it is typical for a transaction to lock a resource so that such a transaction becomes the "owner" of that resource thereby temporarily precluding another transaction from having any access to that resource. A deadlock occurs when transactions seem to be in an infinite wait for a resource and are unable to complete.

There are three types of techniques for dealing with the deadlocks: timeout, deadlock prevention, or deadlock detection. Timeout causes all requests for resources to be denied after some specified waiting interval. It has the disadvantage that as the system becomes more congested, more and more transactions are prematurely terminated, since timeout puts an upper limit on the duration of a transaction's request. Thus, the dynamic properties of timeout make it acceptable for a lightly loaded system, but inappropriate for a congested system.

Deadlock prevention is achieved by requesting all locks at once, or by requesting locks in a specified order, or by never allowing a transaction to wait for a resource. Where deadlock prevention is employed, there is usually the tendency to lock up too many resources at one time, thereby resulting in a very slow and inefficient system.

Accordingly, various schemes have been developed to overcome the deficiencies of timeout and deadlock prevention by providing a sequence of steps for achieving deadlock detection, and initiating resolution procedures whenever deadlock occurs. Prior art techniques usually follow the steps of detecting the deadlock, picking a pending transaction to be the victim in order to break the impasse by preempting the victim from the system, backing such victim(s) out of the system in order to remove any locks on resources which are held by the victim(s), making such a released resource accessible to another pending transaction which is waiting for it, and then in some instances restarting the victim transaction.

However, prior art deadlock detection schemes have proven to be inefficient in congested systems, and have sometimes taken many hours to provide detection and resolution of deadlock situations.

OBJECTS AND BRIEF SUMMARY OF THE INVENTION

It is therefore an object of the invention to provide a unique method and technique for shortening the time required to detect and resolve deadlocks in a congested system where multiple users require access to many of the same resources in order to complete their transactions.

The invention constitutes an improvement over existing deadlock detection techniques by maintaining an updated lock wait matrix based on the maximum number of transactions and the number of critical shared resources which can be locked and waited on by a pending transaction, building a wait tree from such a matrix, periodically pruning in a predetermined pattern the tree branches including turning non-terminal nodes in the tree into terminal nodes, while traversing the tree to detect and resolve deadlocks, with the pruning being done in a manner which minimizes the number of times that nodes representing the same transaction are processed.

These and other objects will be apparent to those skilled in the art in view of the following description of a preferred embodiment of the invention as shown in the accompanying drawings.

DETAILED DESCRIPTION OF THE PRESENTLY PREFERRED EMBODIMENT

Figure 1:
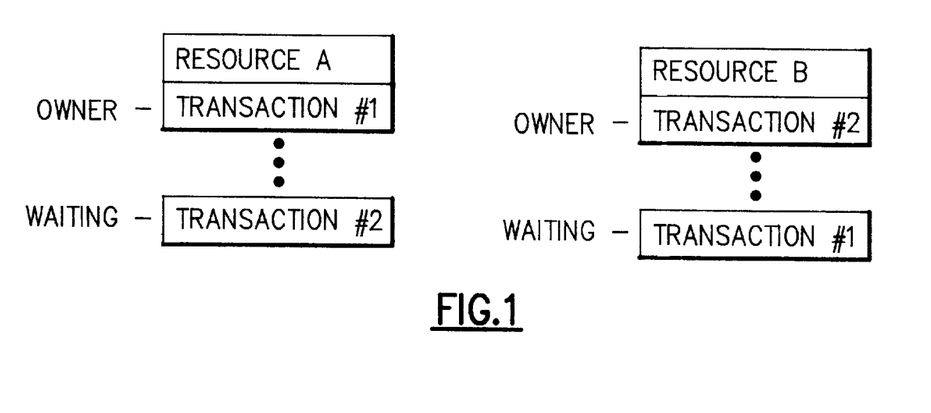
FIG. 1 shows an exemplary case of deadlock involving two transactions and two resources.

In a data processing system having common resources shared by multiple users for various transactions, a deadlock situation exists if two or more transactions are waiting indefinitely to obtain a resource that cannot be obtained. For example, in FIG. 1 an obvious case of deadlock is shown because transaction #1 owns resource A and is waiting for resource B in order to complete the transaction, while at the same time transaction #2 owns resource B and is waiting for resource A. Resource B cannot become available until transaction #2 obtains resource A, and resource A cannot become available until transaction #1 obtains resource B. An infinite cycling pattern occurs because both transactions are waiting indefinitely for resources they cannot obtain.

Figure 2:
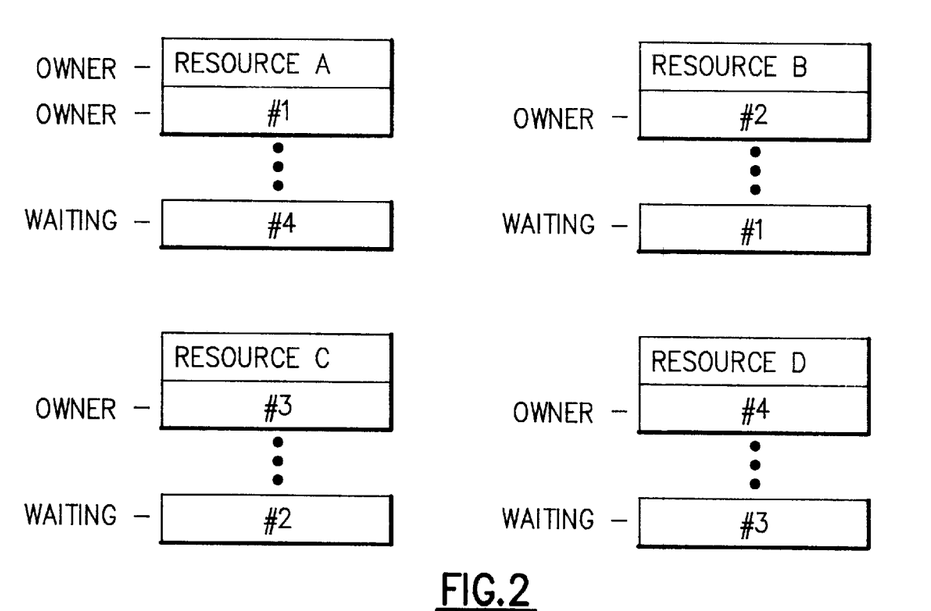
FIG. 2 shows an exemplary case of deadlock involving multiple transactions and multiple resources.
Figure 6:
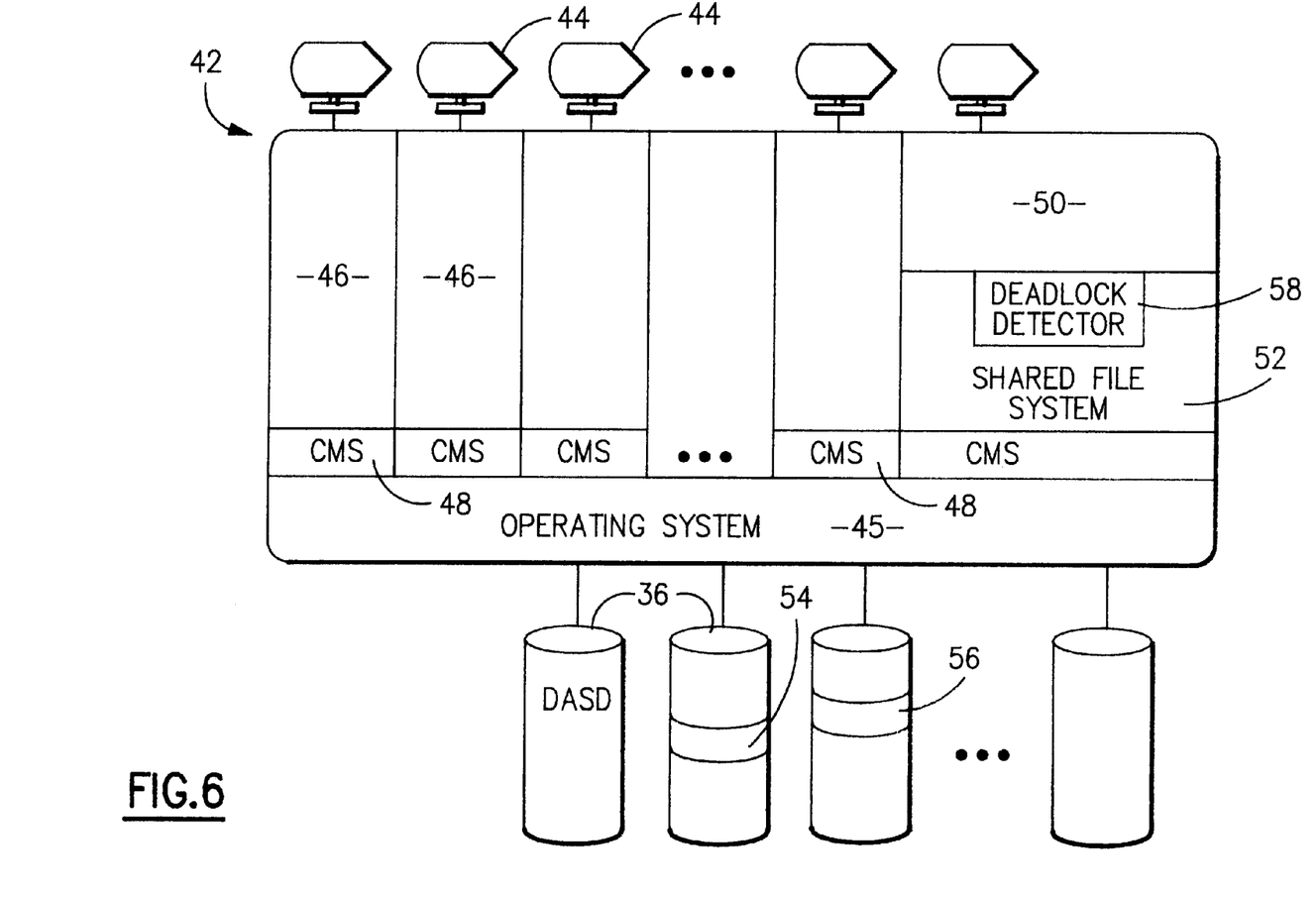
FIG. 6 is a schematic block diagram showing a typical operating environment for the resources of FIG. 4 wherein the deadlock detection module of the present invention is incorporated into a shared file computer system having multiple virtual machine users each having their own virtual machines running a CMS application.

Deadlocks involving more transactions can be less obvious, as shown in FIG. 2. Transaction #1 owns resource A and is waiting for resource B. Transaction #2 owns resource B and is waiting for resource C. Transaction #3 owns resource C and is waiting for resource D. Transaction #4 owns resource D and is waiting for resource A. This also forms an infinite waiting cycle which requires detection and interference from some external control such as a computer operating system. In this regard, the deadlock detection module of the present invention provides such external control by being part of the shared file portion of an interactive operating system such as CMS (Conversational Monitor System), as shown in FIG. 6.

In order to detect deadlock cycles, prior art techniques have used a lock matrix to keep track of the various transactions. The size of the array in the lock matrix is N×N where N is the maximum number of transactions that can run concurrently in the file sharing portion of the computer system. However the ways in which the present invention generates, traverses and prunes a wait tree based on the matrix and the unique sequence of updating the matrix provide benefits which result in quick detection and resolution of deadlocks.

Figure 3:
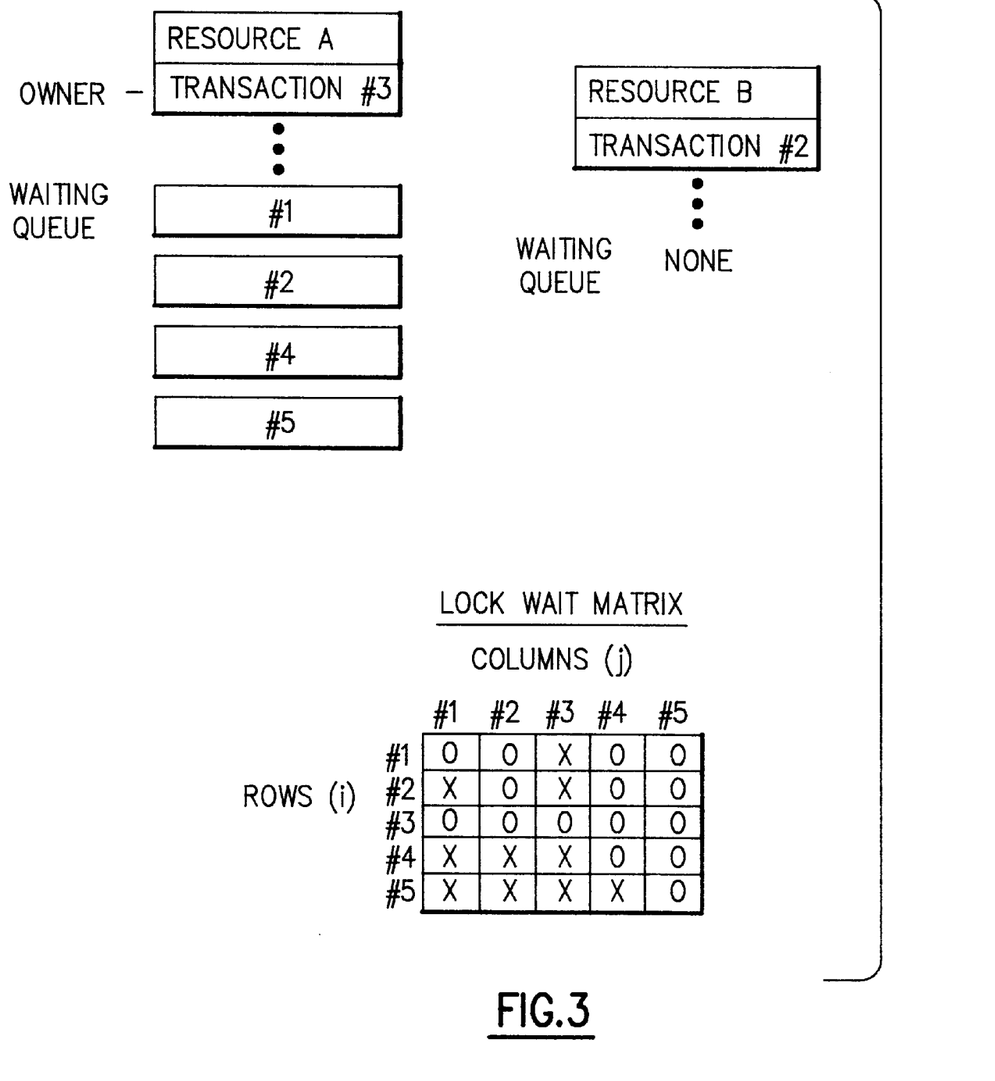
FIG. 3 illustrates an example of a non-deadlock waiting situation involving five transactions and two resources, and shows a lock wait matrix generated from that particular situation.

Referring to FIG. 3, each element of a 5×5 matrix is based on the waiting status of transaction #s 1–5 with respect to shared resources A–B. In the matrix, X is used to indicate a non-zero value. If row i, column j of the matrix is zero, then transaction #i is not waiting on transaction #j. In other words, "zero" means that transaction #j is not being waited on by transaction #i. On the other hand, if row i, column j of the matrix is non-zero, then transaction #i is waiting on transaction #j. In other words, "X" means that transaction #j is being waited on by transaction #i.

In accordance with the invention, the lock matrix is updated in the following situations: Case I—Waiting for a Resource. Every time a transaction must wait for a resource, the appropriate row/column entries are updated in the lock wait matrix to indicate which transactions are being waited on. Case II—Request Denied. This can occur in two ways. The first is when a transaction is preparing to wait for a resource (i.e., during deadlock detection). The second is while a transaction is actually in a waiting queue for a locked resource. In either case a transaction waiting for a resource or preparing to wait for a resource is told they cannot have a certain resource (i.e., the lock request is denied), the appropriate row/column entries are updated to indicate that this transaction is no longer waiting for the resource. Case III—Request Granted. Every time a transaction waiting for a resource is told they can have the resource (i.e., the lock request is granted), the appropriate row/column entries in the lock wait matrix are updated to indicate that this transaction is no longer waiting for the resource.

In the preferred embodiment of the present invention, the deadlock detection module is only invoked when Case I is encountered. The lock wait matrix is updated prior to its invocation to generate a wait tree. From a computer logic point of view, deadlock detection as provided in the present invention consists of three major steps: building a WAIT tree, pruning the WAIT tree, and traversing the WAIT tree to resolve deadlocks. The preferred form of the present invention actually builds, prunes, and traverses the WAIT tree in one sequence. In this regard, the unique way in which the branches of the WAIT tree are pruned are an important feature of the invention.

Figure 4:
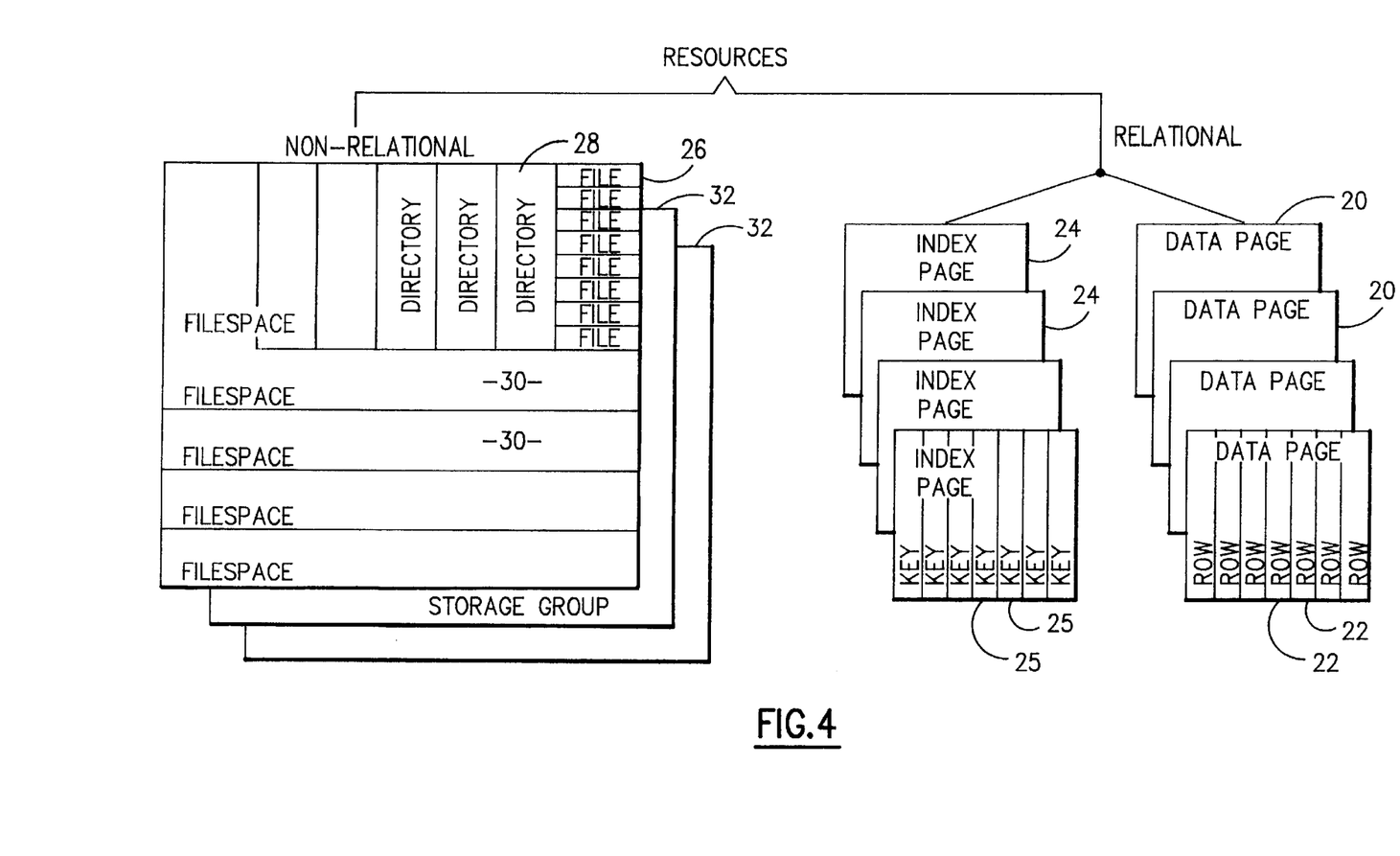
FIG. 4 illustrates typical examples of relational and non-relational resources which are shared by multiple transactions in a presently preferred embodiment of the invention.

In a computer file sharing system, as shown in FIG. 4, both relational and non-relational data base type resources exist. In a congested system, it was found that the present invention was particularly helpful in connection with deadlocks arising from contention for access to the relational data base resources. However, the invention works equally well with non-relational data base type resources.

Relational resources exist in a relational data base system used by a file system to store information pertaining to the file system. In that regard, data pages 20 having smaller entities called rows 22 contain relational information, and index pages 24 having smaller entities called keys 25 also contain relational information. In a typical shared file system, data pages and index pages are shared among the different users of the file system. In order to guarantee the validity of the above resources, locking protocols are followed when accessing any of these resources. In order to avoid lengthy time-consuming deadlocks, deadlock detection in accordance with the present invention must be performed whenever a transaction must wait for any of these resources which has already been locked.

To a lesser extent, deadlocks also arise with respect to non-relational resources in a data base system. Non-relational resources are objects within the logical file system used to store data. Files 26 are the lowest level of objects in the file system, and they reside as groups in directories 28. Directories form larger entities called filespaces 30, which reside in still larger entities called storage groups 32.

Nevertheless,it is believed that the present invention is applicable to various types of other shared file systems in addition to the specific ones illustrated herein.

Figure 5:
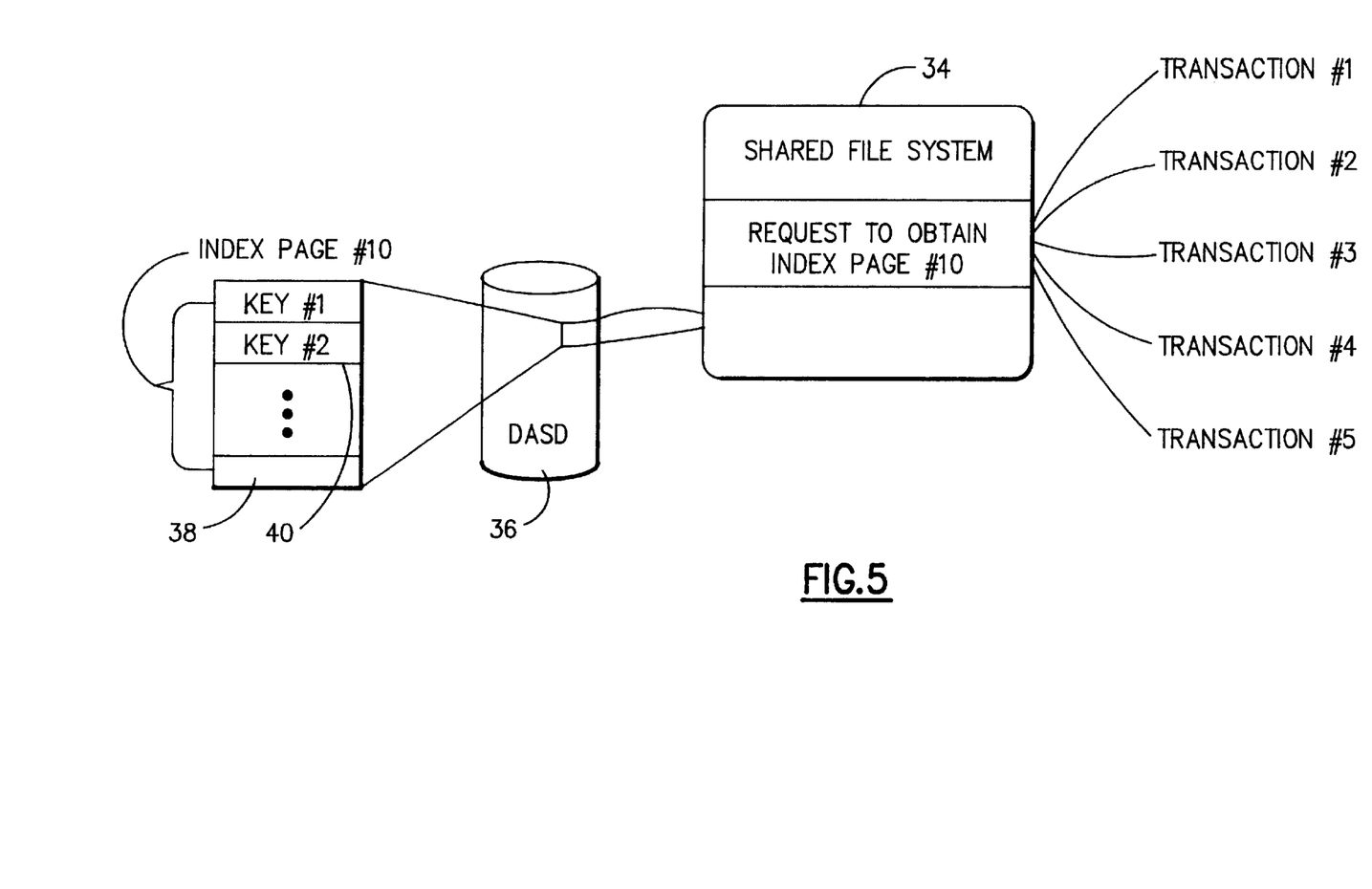
FIG. 5 is a schematic block diagram showing a typical situation involving relational resources which might lead to deadlock where five different transactions are contending for access to the same index page.

Referring to FIG. 5, various transaction #s 1–5 are shown contending for access to the same resource. In the illustrated embodiment, these transactions are application programs running in virtual CPUs that access information in a shared file system 34, or interactive commands running in virtual CPUs that access information in the shared file system. These transactions can be attempting to perform functions such as reading/writing files, creating directories, enrolling users, granting authorities, deleting files, or any number of other shared file related activities. In order to perform these functions, the shared file system must obtain resources. In this case, transaction #s 1–5 are each performing a function that requires them to obtain a resource index page #10 which resides in DASD 36. In that regard, it is noted that even though each transaction may be updating a different key 38, 40, it is required that the entire index page be locked during the transaction, thus preventing other transactions from accessing specifically different keys located in the same index.

Referring to FIG. 6, the specific environment for which the preferred embodiment of the present invention was developed consists of a single host computer 42 with attached input devices such as terminals 44 and external storage such as DASD 36. Within the host computer, an operating system 45 is used to simulate virtual CPUs 46 which are controlled by an interactive operating system such as CMS 48. One of these virtual CPUs constitutes a file pool server 50 which includes a shared file system 52. The shared file pool constitutes a collection of mini-disks on the DASD 36 for providing relation resources 54 and non-relational resources 56. A deadlock detection module 58 for practicing the monitoring and control techniques of the present invention is preferably installed as part of the server which operates the shared file system.

Figure 7:
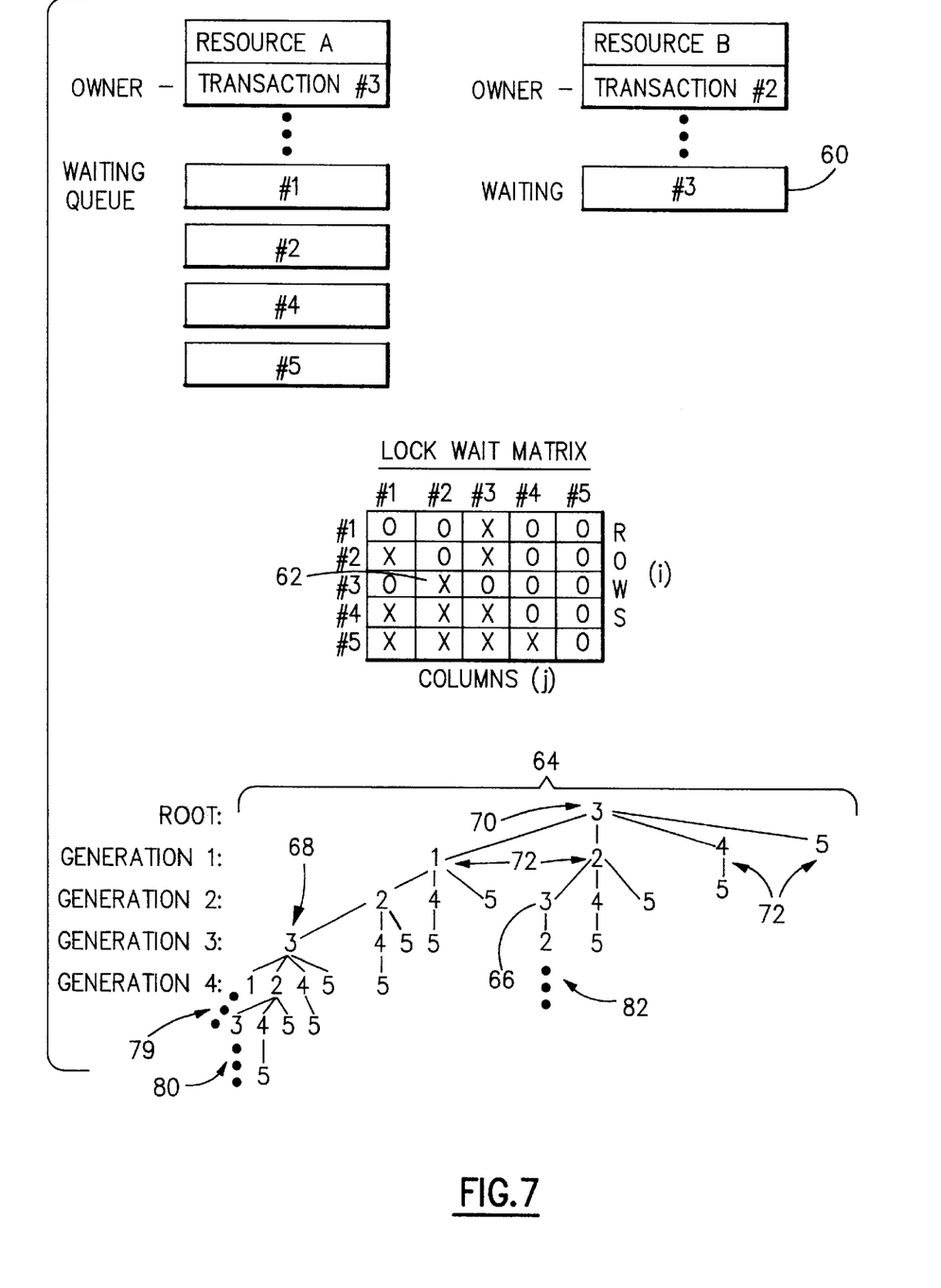
FIG. 7 illustrates an example of a deadlock waiting situation involving five transactions and two resources, and shows a lock wait matrix generated from that particular situation as well as an infinite wait tree based on the matrix.

Referring now to FIG. 7, it is shown what happens when transaction #3 requests a lock on Resource B which is already owned by transaction #2. Transaction #3 therefore takes a waiting position at 60 and the lock wait matrix is updated at 62 by showing a non-zero value X at the column two/row three position. Thus, the potential wait tree which would be generated as a result of this change in the lock wait matrix is shown at 64 and includes transaction #3 waiting for transaction #2 in the second generation of the tree at 66 (along with sibling transactions #4 and #5 which are waiting behind transaction #2 in the waiting queue for resource A). Such a potential WAIT tree also includes transaction #3 waiting for transaction #2 in the third generation of the tree at 68. Thus, the root node at 70 has its four children at 72, and the children of each child node are defined as the indexes (i.e., positions in the lock wait matrix) of transactions waiting for that particular child transaction. This is determined by looking down the child's column in the lock wait matrix. In the example of FIG. 7, the children of transaction #1 are #2, #4, #5: the children of transaction #2 are #3, #4, #5; the only child of transaction #4 is #5; and transaction #5 has no children.

The defining of children occurs recursively for each generation. However, a problem exists because the WAIT tree can have an infinite number of generations (as shown in FIG. 7 at 79, 80, 82). These infinite patterns are known as cycles. Cycles are detected when a child node created in the WAIT tree already exists in a direct path from the newly created child back to the root node. In order to eliminate cycles and increase the speed of the search, the invention periodically prunes branches of the WAIT tree. There are three cases where it becomes necessary to prune branches.

Figure 11:
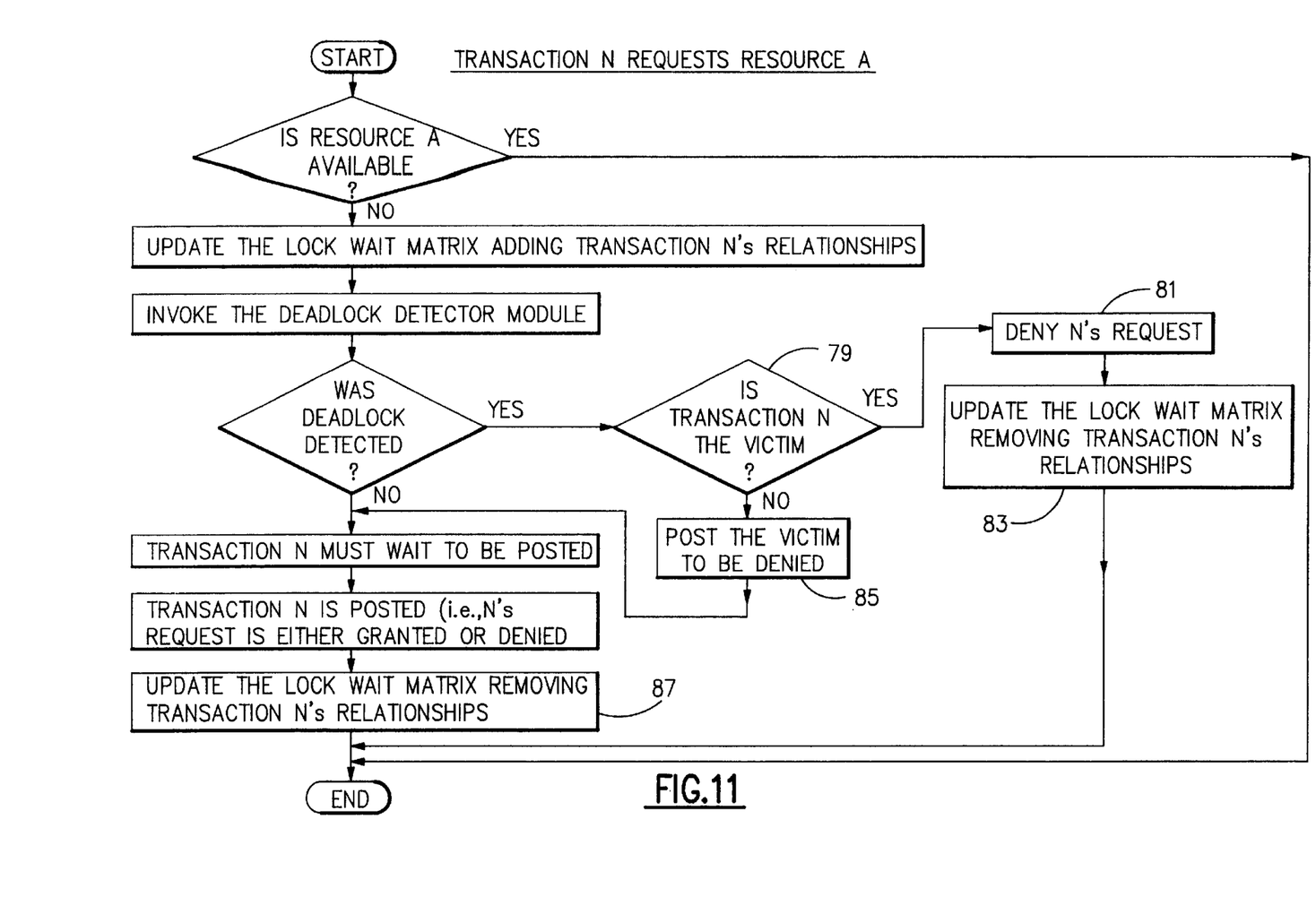
FIG. 11 is a flow chart showing the sequence of updating the lock wait matrices of FIGS. 3 and 7.
Figures 12, 12B:
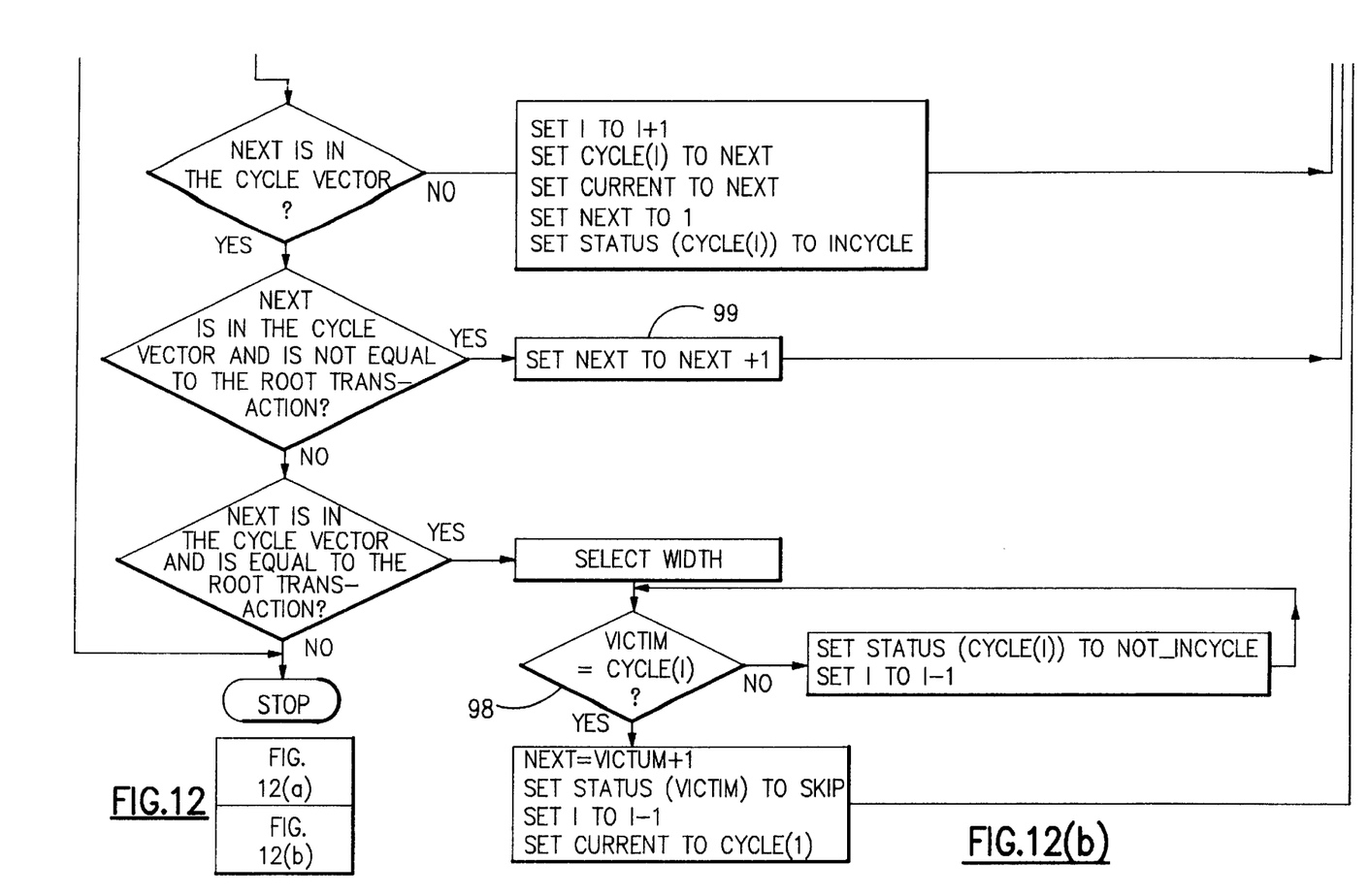
FIG. 12 is a flow chart showing the software program of a presently preferred embodiment of a deadlock detection module.
Figure 12A:
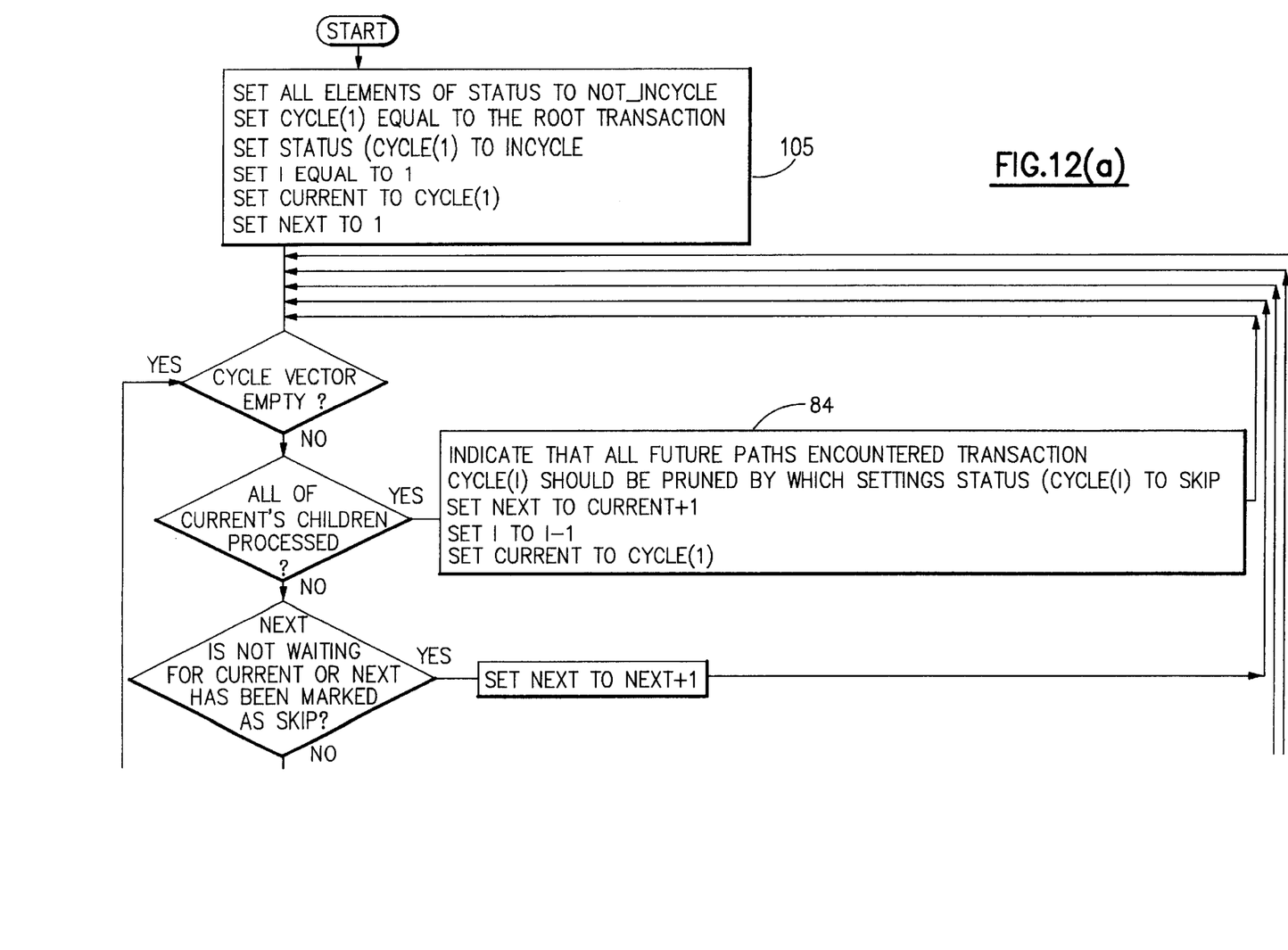

Case 1: If a cycle is detected and the newly created child is the same as the root node, then a new deadlock is detected (this type of cycle is shown in FIG. 7 at 79, 80, 82). In this case a particular transaction # is chosen as a victim in order to break the deadlock. As shown in the flow chart of FIG. 11 at 79, once a new deadlock is detected it becomes necessary to select either the root node transaction or another transaction as a victim. If the root node transaction # is chosen as a victim, then its request for a resource lock is denied 81 and all of its waiting relationships are removed 83 from the lock wait matrix. If another transaction # is chosen as a victim, then the victim is posted 85. Posting is the technique used to alert the victim that his request was denied. Posting makes the victim eligible to continue execution. Once the victim begins execution, the victim's waiting relationships are removed from the lock wait matrix (FIG. 11 at 87). Once the victim has been chosen, the WAIT tree is pruned as shown in FIG. 12 at 98.

Case 2: If a cycle is detected and the newly created child is not the same as the root node, then a previously resolved deadlock is detected. This type of deadlock occurs when the victim of a previously detected deadlock has not yet resumed execution and therefore has not yet updated the lock wait matrix. These types of deadlock are not interesting (because they have already been resolved). The deadlock detector ignores these type of deadlocks by pruning the newly created node from the WAIT tree. This is done in FIG. 12 at 99.

Case 3: If all of the children of a particular transaction # have been traversed, there is no need to process that particular transaction # again (this includes the situation where a transaction has no children as well as the situation where a transaction is a parent node with children). The deadlock detector prunes all remaining branches involving that transaction number. This is done in FIG. 12 at 84.

Figure 8:
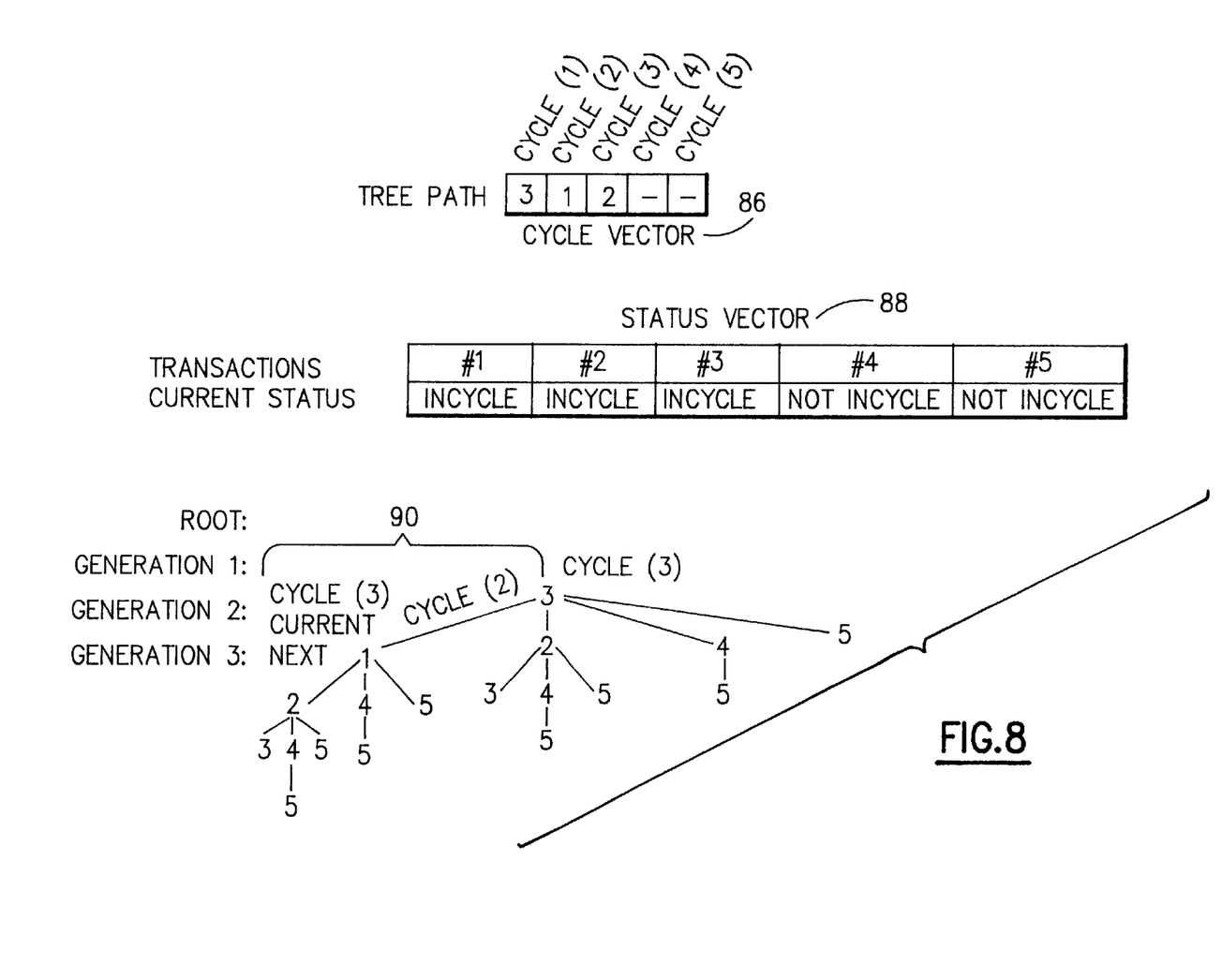
FIG. 8 shows a CYCLE vector used in the present invention to track the processing path of the present invention through a wait tree and a STATUS vector used in the present invention to store the status of each transaction, and a partially pruned wait tree which corresponds to the values in the CYCLE and STATUS vectors.

In order to accomplish the traversing and pruning methods described above, the invention provides a CYCLE vector 86 to store the path of the WAIT TREE currently being processed, and a STATUS vector 88 to store the status of each transaction # (see FIG. 8). The size of each of the CYCLE and STATUS vectors must be equal to the maximum number of transactions which have access to the shared resources. Values are placed in the CYCLE and STATUS vectors as the deadlock detection processing occurs along one path of the tree at a time. In the preferred embodiment of the invention, such processing starts along the leftmost path of the tree at 90. As the processing along the path proceeds, the values in the CYCLE and STATUS vectors are used to determine when it is necessary to prune the WAIT tree of FIG. 7. Of course, other systematic searching paths can be used without departing from the spirit and scope of the invention.

Each element of the STATUS vector can contain one of a possible three values. NOT_INCYCLE indicates the transaction # is not in the path of the tree which is currently being processed. Conversely INCYCLE indicates the transaction is in the path of the tree currently being processed. SKIP indicates that the tree can and should be pruned when this transaction # is encountered during the traversing along a path of the tree.

FIG. 8 shows the CYCLE and STATUS vectors at the time the branch in the WAIT tree containing nodes 3, 1 and 2 are being processed 90. The CYCLE vector 86 contains the values 3, 1, and 2. The STATUS vector 88 indicates that nodes 3, 2, and 1 are currently in the CYCLE vector and nodes 4 and 5 are not in the CYCLE vector.

The next node to be placed in the CYCLE vector is 2, but 3 forms a cycle with the root transaction. The deadlock detector will pick a victim to break the deadlock and prune the tree.

Figure 9:
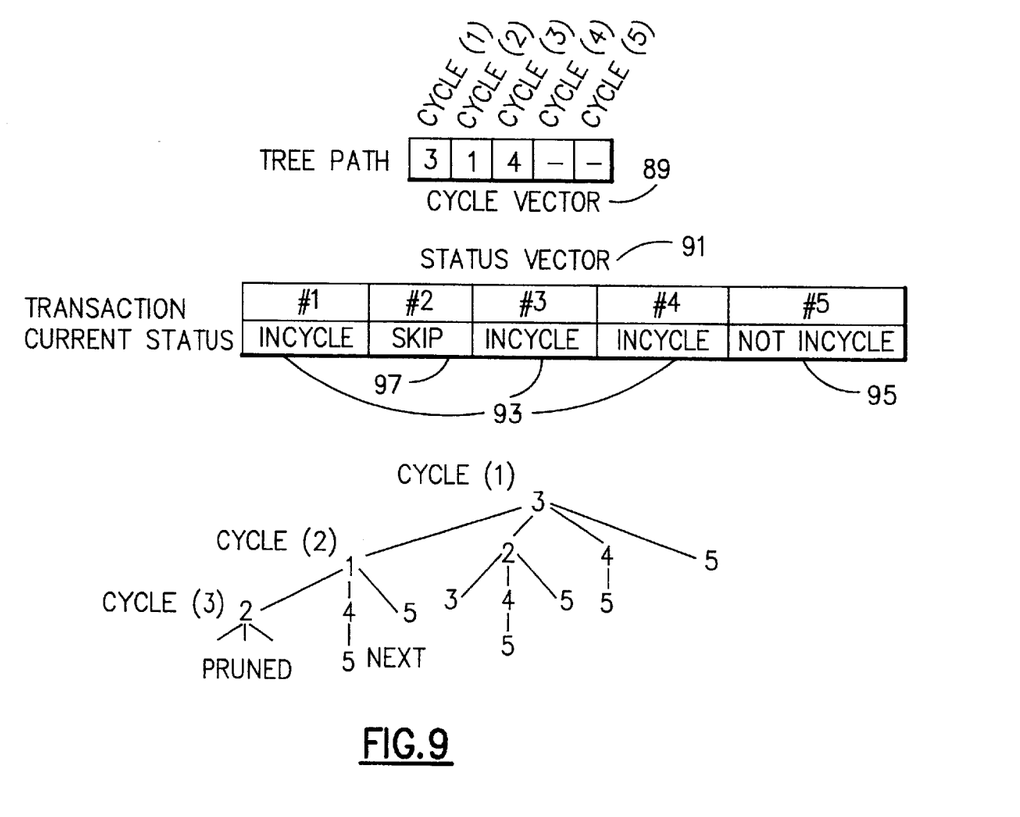
FIG. 9 shows a CYCLE vector used in the present invention and a STATUS vector used in the present invention after choosing transaction #2 as a victim of the deadlock detected in a path shown in FIG. 8, and a partially pruned wait tree which corresponds to the values in the CYCLE and STATUS vectors.

FIG. 9 shows the CYCLE and STATUS vectors after the pruning has been done. The modified CYCLE vector 89 contains the values 3, 1, and 4. The modified STATUS vector 91 indicates at 93 that 3, 1, and 4 are in the CYCLE vector; it further indicates at 95 that 5 is not in the CYCLE vector; and 2 is marked as SKIP at 97.

Figure 10:
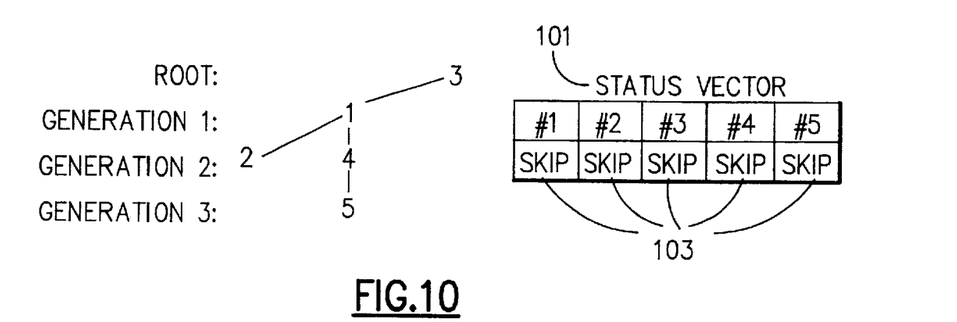
FIG. 10 shows the abbreviated portion of a pruned wait tree and a corresponding STATUS vector which results from the deadlock detection techniques of the present invention.

FIG. 10 shows the abbreviated WAIT tree that was actually generated and traversed (based on the assumption that transaction #2 was chosen as a victim in the example of FIG. 8) in order to detect and resolve the deadlock. The modified STATUS vector 101 shows its values at the end of such processing, with 1, 2, 4, and 5 marked as SKIP 103 thus providing the basis for the subsequent pruning to create the abbreviated wait tree. When a transaction is again unable to obtain a requested resource, all elements in the STATUS vector are set to NOT_INCYCLE and the whole procedure of generating/traversing/pruning of a new wait tree starts again 105 based on the updated entries in the matrix.

The deadlock detection technique and method of the present invention clearly provides better performance than the prior art techniques which were based on a lock wait type of matrix. Such prior art techniques did not perform extensive pruning of the WAIT tree while it was being generated, and the net result was that the prior art deadlock detection required that a much larger WAIT tree be traversed. In contrast, under the provisions of the present invention, it is necessary to traverse a much smaller WAIT tree in order to detect and resolve a deadlock situation.

The pseudocode for implementing the preferred sequential traverse of a WAIT tree is shown below in Table I:

TABLE I

```
Set all elements of STATUS to NOT_INCYCLE
Set CYCLE(1) equal to the root Transaction
Set STATUS(CYCLE(1)) to INCYCLE
Set I equal to 1
Set CURRENT to CYCLE(1)
Set NEXT to 1
Do While I > 0
    If NEXT > the maximum number of transactions
    /************************************************************************/
    /* Case 1:   All of CURRENT's children have been processed and          */
    /*           no deadlocks were found. Any path that encounters          */
    /*           CURRENT in the future can be pruned. Now processing       */
    /*           must continue by looking for CURRENT's next sibling.       */
    /************************************************************************/
        Indicate that all future paths encountered with transaction
        CYCLE(I) should be pruned by setting STATUS(CYCLE(I)) to SKIP
        Set NEXT to CURRENT+1
        Set I to I-1
        Set CURRENT to CYCLE(I)
    ELSE
        If the (NEXT,CURRENT) element of the lock wait matrix is zero OR
            STATUS(NEXT) equals SKIP
    /************************************************************************/
    /* Case 2:   NEXT is not waiting for CURRENT or NEXT has been          */
    /*           marked as a node that should be pruned.                    */
    /************************************************************************/
            Set NEXT to NEXT + 1
        ELSE
            IF STATUS(NEXT) not equal to INCYCLE
    /************************************************************************/
    /* Case 3:   NEXT is a child of CURRENT that is not in the path        */
    /*           from CURRENT to the root. Start processing NEXT's         */
    /*           children.                                                  */
    /************************************************************************/
                Set I to I+1
                Set CYCLE(I) to NEXT
                Set CURRENT to NEXT
                Set NEXT to 1
                Set STATUS(CYCLE(I)) to INCYCLE
            ELSE
                IF NEXT not equal to the root
    /************************************************************************/
    /* Case 4:   NEXT is a child of CURRENT that is in the path            */
    /*           from CURRENT to the root. NEXT formed a cycle.            */
    /*           but not with the root. This can happen because the        */
    /*           victim of a previously resolved deadlock was not          */
    /*           dispatched yet. This cycle is not very interesting.       */
    /*           Since the tree being traversed is the FINITE WAIT         */
    /*           tree, no children are defined for it.                     */
    /************************************************************************/
                    Set NEXT to NEXT +1
                ELSE
    /************************************************************************/
    /* Case 5:   NEXT is a child of CURRENT that is in the path            */
    /*           from CURRENT to the root. NEXT formed a cycle with        */
    /*           root. This means that everybody in the path is            */
    /*           deadlocked. Somebody must be picked as a victim.          */
    /*           The victim's lock request will be denied the next         */
    /*           time he is dispatched. The criteria for picking a         */
    /*           victim is unimportant to this algorithm.                  */
    /************************************************************************/
                    Select VICTIM
    /************************************************************************/
                    /* Any future deadlock involving the VICTIM is already */
                    /* resolved (i.e. the VICTIM has already lost). Prune  */
                    /* the tree so we will start searching again past the  */
                    /* VICTIM.                                             */
    /************************************************************************/
                    DO WHILE VICTIM-=CYCLE(I)
                        SET STATUS(CYCLE(I)) to NOT_INCYCLE
                        Set I to I-1
                    END
                    NEXT=VICTIM+1
```

TABLE I-continued

```
                    Set STATUS(VICTIM) to SKIP
                    Set I to I-1
                    Set CURRENT to CYCLE(I)
                Endif
            Endif
        Endif
    Endif
End
```

In congested systems as the number of transactions waiting for one particular resource increases, the WAIT tree traversed by prior art grows exponentially. The number of child nodes processed by prior art techniques is on the order of $2^W$ where W is the number of transactions waiting on the owner. In the example of FIG. 7, the entire WAIT tree 70 is the wait tree traversed using prior art techniques.

In congested systems as the number of transactions waiting for one particular resource increases, the WAIT tree traversed by techniques described in this invention grows at a linear rate. The number of child nodes processed by using the techniques described in this invention is on the order of W where W is the number of transactions waiting on the owner. FIG. 10 illustrates the WAIT tree traversed using the techniques described in this invention. In that regard, this invention is applicable to batch, interactive, and various other programs where resource deadlock is a problem.

While a preferred embodiment of the invention has been shown and described, there are many changes and modifications that will be apparent to those skilled in the art without departing from the scope and spirit of the invention as defined in the following claims.

What is claimed is:

1. A method of reducing search time through a lock wait matrix representing a hierarchy of transactions waiting to access a resource, each of said transactions which waits on another transaction descends from said other transaction in said hierarchy, said method comprising the computer implemented steps of:

searching in said hierarchy a path of transactions including a parent transaction and all descendants of said parent transaction, and recording transactions encountered in the search, said parent transaction not being deadlocked; and subsequently searching, generally downwardly through said hierarchy, another path of transactions emanating from a transaction of the first said path, recording transactions encountered in the search of said other path, comparing transactions encountered in the search of said other path to said parent transaction, and terminating the searching and recording of transactions of said other path before an end of said other path when encountering said parent transaction.

2. A method as set forth in claim 1 wherein there were no deadlocked transactions encountered in the search of said other path.

3. A method as set forth in claim 1 further comprising the computer implemented steps of:

subsequently searching, generally downwardly through said hierarchy, still another path of transactions emanating from a great grand parent transaction of said descendants, recording transactions encountered in the search of said still other path, comparing transactions encountered in the search of said still other path to said grand parent transaction, and terminating the searching and recording of transactions of said still other path before an end of said still other path when encountering said grand parent transaction.

4. A method as set forth in claim 3 wherein said still other path does not include said parent transaction in a higher level than said grand parent transaction.

5. A method as set forth in claim 1 wherein said descendants are end nodes in said hierarchy.

6. A method as set forth in claim 1 further comprising the computer implemented steps of searching, generally downwardly through said hierarchy, still another path of transactions emanating from a transaction of said first path, recording transactions encountered in the search of said still other path, comparing each transaction encountered in the search of said still other path to a highest transaction of said first path, and terminating the searching and recording of transactions of said still other path before an end of said still other path when encountering another occurrence of said highest transaction.

7. A method as set forth in claim 6 further comprising the computer implemented steps of:

searching, generally downwardly through said hierarchy, yet another path of transactions emanating from a transaction of said first path, recording transactions encountered in the search of said yet other path, comparing transactions encountered in the search of said yet other path to said parent transaction, and terminating the searching and recording of transactions of said yet other path before an end of said yet other path when encountering said parent transaction.

8. A method as set forth in claim 6 further comprising the computer implemented step of denying one of the transactions encountered in the search of said still other path to break a deadlock.

9. A method as set forth in claim 1 wherein said first path traverses multiple levels of said hierarchy and said other path emanates from a grand parent transaction of said descendents.

10. A system for reducing search time through a lock wait matrix representing a hierarchy of transactions waiting to access a resource, each of said transactions which waits on another transaction descends from said other transaction in said hierarchy, said system comprising:

means for searching in said hierarchy a path of transactions including a parent transaction and all descendants of said parent transaction, and recording transactions encountered in the search; and means for subsequently searching, generally downwardly through said hierarchy, another path of transactions emanating from a transaction of the first said path, recording transactions encountered in the search of said other path, comparing transactions encountered in the search of said other path to said parent transaction, and terminating the searching and recording of transactions of said other path before an end of said other path when encountering said parent transaction regardless of whether said parent transaction is deadlocked.

11. A system as set forth in claim 10 wherein there were no deadlocked transactions encountered in the search of said first path.

12. A system as set forth in claim 10 further comprising:

means for subsequently searching, generally downwardly through said hierarchy, still another path of transactions emanating from a great grand parent transaction of said descendents, recording transactions encountered in the search of said still other path, comparing transactions encountered in the search of said still other path to said grand parent transaction, and terminating the searching and recording of transactions of said still other path before an end of said still other path when encountering said grand parent transaction.

13. A system as set forth in claim 12 wherein said still other path does not include said parent transaction in a higher level than said grand parent transaction.

14. A system as set forth in claim 10 wherein said descendants are end nodes in said hierarchy.

15. A system as set forth in claim 10 further comprising means for searching, generally downwardly through said hierarchy, still another path of transactions emanating from a transaction of said first path, recording transactions encountered in the search of said still other path, comparing each transaction encountered in said still other path to a highest transaction of said first path, and terminating the searching and recording of transactions of said still other path before an end of said still other path when encountering another occurrence of said highest transaction.

16. A system as set forth in claim 15 further comprising:

means for searching yet another path of transactions emanating from a transaction of said first path, generally downwardly through said hierarchy, recording transactions encountered in the search of said yet other path, comparing transactions encountered in the search of said yet other path to said parent transaction, and terminating the searching of and recording of transactions in said yet other path before an end of said yet other path when encountering said parent transaction.

17. A system as set forth in claim 15 further comprising means for denying one of the transactions encountered in the search of said still other path to break a deadlock.

18. A system as set forth in claim 10 wherein said first path traverses multiple levels of said hierarchy and said other path emanates from a grand parent transaction of said descendents.

19. A system as set forth in claim 10 wherein two instances of a same transaction were encountered in the search of said other path; and further comprising means for denying said same transaction or another transaction between the two instances of said same transaction in said other path.

20. A method as set forth in claim 1 wherein two instances of a same transaction were encountered in the search of said other path; and further comprising the computer implemented step of denying said same transaction or another transaction between the two instances of said same transaction in said other path.

21. A method of reducing search time through a lock wait matrix representing a hierarchy of transactions waiting to access a resource, each of said transactions which waits on another transaction descends from said other transaction in said hierarchy, said method comprising the computer implemented steps of:

searching in said hierarchy a path of transactions including a parent transaction and all descendants of said parent transaction, and recording transactions encountered in the search; and subsequently searching, generally downwardly through said hierarchy, another path of transactions emanating from a transaction of the first said path, recording transactions encountered in the search of said other path, comparing transactions encountered in the search of said other path to said parent transaction, and terminating the searching and recording of transactions of said other path before an end of said other path when encountering said parent transaction regardless of whether said parent transaction is deadlocked.

22. A computer program product for reducing search time through a lock wait matrix representing a hierarchy of transactions waiting to access a resource, each of said transactions which waits on another transaction descends from said other transaction in said hierarchy, said computer program product comprising:

a computer readable medium;

first program instruction means for instructing a processor to search in said hierarchy a path of transactions including a parent transaction and all descendants of said parent transaction, and record transactions encountered in the search, said parent transaction not being deadlocked; and second program instruction means for instructing a processor to subsequently search, generally downwardly through said hierarchy, another path of transactions emanating from a transaction of the first said path, record transactions encountered in the search of said other path, compare transactions encountered in the search of said other path to said parent transaction, and terminate the searching and recording of transactions of said other path before an end of said other path when encountering said parent transaction; and wherein said first and second program instruction means are recorded on said medium in executable form.

23. A method as set forth in claim 22 wherein there were no deadlocked transactions encountered in the search of said other path.

24. A method as set forth in claim 22 wherein said descendants are end nodes in said hierarchy.

25. A computer program product as set forth in claim 22 further comprising third program instruction means for instructing a processor to search, generally downwardly through said hierarchy, still another path of transactions emanating from a transaction of said first path, record transactions encountered in the search of said still other path, compare each transaction encountered in the search of said still other path to a highest transaction of said first path, and terminate the searching and recording of transactions of said still other path before an end of said still other path when encountering another occurrence of said highest transaction; and wherein said third program instruction means is recorded on said medium in executable form.

26. A computer program product as set forth in claim 25 further comprising fourth program instruction means for instructing a processor to deny one of the transactions encountered in the search of said still other path to break a deadlock, and wherein said fourth program instruction means is recorded on said medium in executable form.

* * * * *